June 28, 1927.
J. F. MacINDOE
LUBRICATOR
Filed Dec. 31, 1925
1,634,109
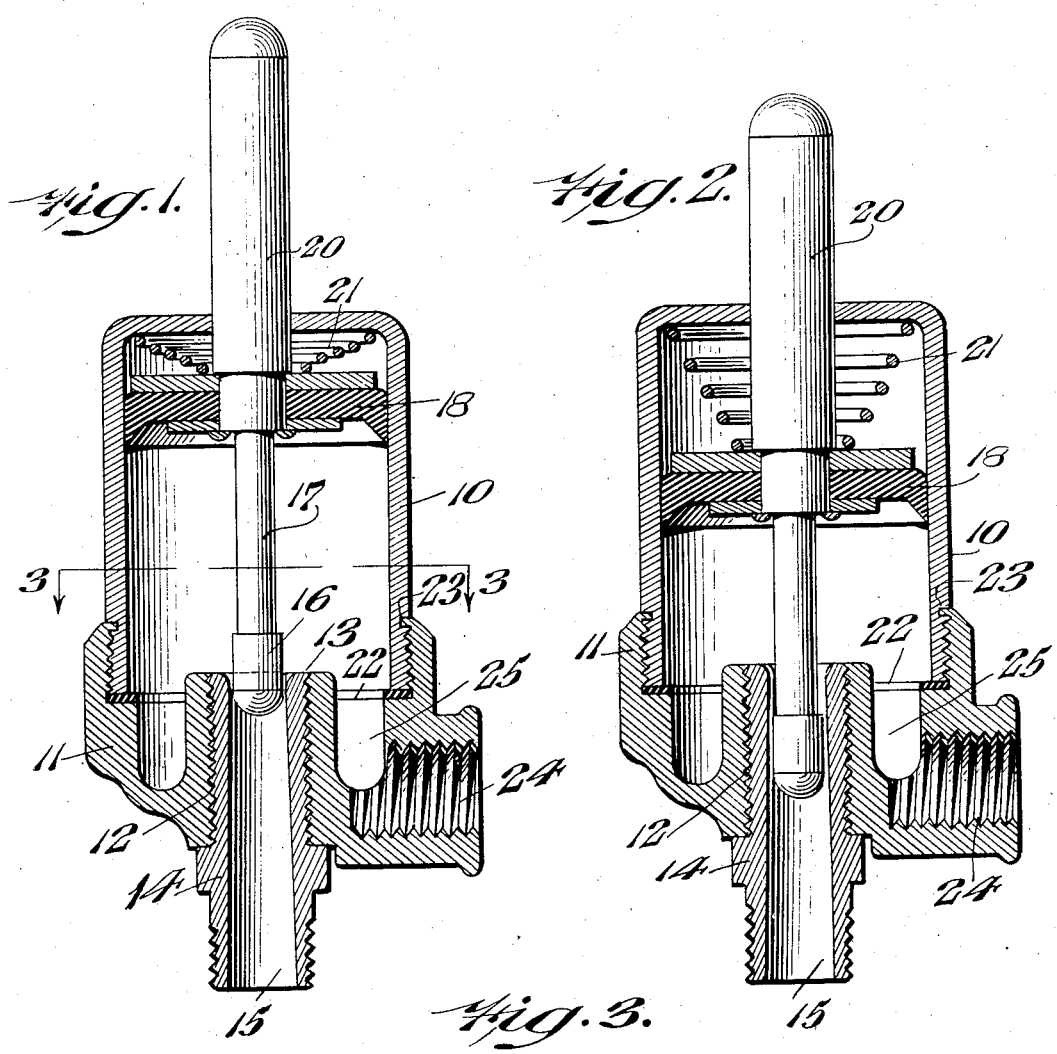
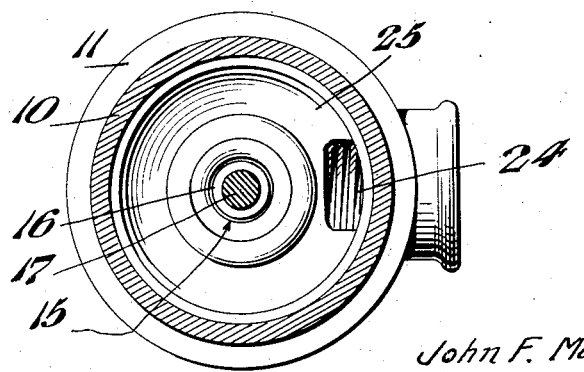
Inventor
John F. MacIndoe,
By Robert M. Barr.
Attorney Patented June 28, 1927.

1,634,109

UNITED STATES PATENT OFFICE.

JOHN FRANKLIN MacINDOE, OF EAST FALLS, PHILADELPHIA, PENNSYLVANIA.

LUBRICATOR.

Application filed December 31, 1925. Serial No. 78,597.

The present invention relates to lubricators and more particularly to pressure discharge containers, such for example as shown in applicant's prior Patents Nos. 1,283,841 and 1,353,171.

Some of the objects of the present invention are to provide an improved automatic lubricating device; to provide a simple and efficient means for discharging lubricant from a container to one or more points of use; to provide improved structural details of lubricators whereby the cost of manufacture is materially reduced; to provide means for filling pressure lubricators without waste; to provide means whereby bearings or other moving parts are not flooded with lubricant while the lubricator is being filled; and to provide other improvements as will hereinafter appear.

In the accompanying drawings Fig. 1 represents a sectional elevation of a lubricator embodying one form of the present invention; Fig. 2 represents a similar elevation showing the parts in another position; and Fig. 3 represents a section on line 3—3 of Fig. 1.

Referring to the drawings, one form of the present invention comprises a receptacle or container 10 for grease, oil or any other lubricating medium which can be forced by pressure to points of use. As here shown the container 10 is mounted in inverted position upon a base 11 in the form of a fitting having a threaded hole 12 to receive the threaded stem 13 of a discharge member 14 which provides a passage 15 communicating with the interior of the container 10.

For the purpose of controlling the discharge of lubricant from the container 10 by way of the passage 15, a valve plug 16 is provided which has a diameter slightly less than the internal diameter of the passage 15 at its inlet end so that a predetermined minimum discharge area is always open to the free flow of lubricant from the container 10.

In order to vary the area of discharge and proportion the flow of lubricant in accordance with varied presure upon the lubricant, the passage 15 gradually tapers or diverges from its inlet end to its discharge end, and the valve plug 16 is carried by a shank 17 attached to a movable plunger 18 which has a snug sliding fit within the container 10. Preferably the shank 17 has an extension 20 projecting through the end of the container to thereby serve as an indication of the position of the plunger 18 so that the quantity of lubricant in the container can be ascertained by merely looking at the projecting extension 20.

In order to force the lubricant from the container 10, a coiled spring 21 of helical form is interposed between the end of the container 10 and the plunger 18 and is placed under compression by the lubricant which is forced into the container by a suitable pressure. The action of the spring 21 therefore is to maintain the lubricant under pressure for discharge purposes and its maximum pressure is applied when the valve plug 16 is located directly in the inlet to the passage 15. As the spring pressure gradually decreases as the plunger 18 moves toward the discharge end of the container, the valve plug 16 in turn is continually entering a larger diameter of the passage 15 and thus increases the area of liquid discharge in direct proportion to the weakening of the spring 21. The result is an even lubricant discharge and a uniform flow thereof to the points of use.

As here shown the container 10 is threaded into the fitting or body 11 where it seats against a packing washer or gasket 22 which prevents leakage at the joint. Also a groove 23 is provided at the end of the container thread so that the lip of the fitting opening can be sprung or forced into such groove 23 to interlock the parts, thus eliminating nuts or other clamping means and materially reducing the cost of manufacture.

In order to introduce the lubricant into the container for filling purposes and to make the device ready for use an opening 24 is provided in the side of the body 11 and is preferably threaded to receive and permit connection of a gun or other device for supplying lubricant under pressure. This opening 24 communicates with an annular space 25 formed concentrically about the inlet end of the passage 15 and opening into the body of the container 10. In this way the lubricant under pressure is introduced into the container 10 at the opposite side of the valve plug 16 from the passage 15 and consequently the lubricant is prevented from free access to the passage 15 and the bearings to which it leads. The entering lubricant therefore acts directly upon the plunger 18 to force it back to compress the spring 21 and at the same time reduces the discharge area by returning the valve plug 16 to the smallest area of the passage 15.

In lubricators of the pressure filled type it has been the practice to introduce the filling charge by way of the discharge passage of the device and hence since the lubricant will take the course of least resistance a quantity of the lubricant escapes by way of the discharge and floods the bearings or other parts and unnecessarily wasting the lubricant. By the present invention this and other disadvantages are overcome because the lubricant enters the container directly and its path of movement is away from the inlet to the discharge passage. Furthermore the valve controlling the discharge passage is in the path of the entering lubricant and prevents its free escape.

While only a single form is shown in which this invention may be embodied, it is to be understood that the invention is not limited to any specific construction, but might be applied to various forms without departing from the spirit of the invention or the scope of the appended claims.

Having now described my invention, what I claim is:—

1. In a lubricator, a container for lubricant provided with a discharge passage, a valve member for controlling said passage, a plunger slidably mounted within said container and connected to said valve member, means holding said plunger under pressure to eject lubricant from said container by way of said passage, and means to introduce lubricant into said container between said plunger and the inlet to said discharge passage.

2. In a lubricator, a container for lubricant provided with a discharge passage, a valve member controlling said passage, a plunger slidably mounted in said container, said plunger being operatively associated with said valve member, means for moving said plunger and valve member simultaneously to uniformly eject lubricant from said container by way of said passage, and means to introduce lubricant into said container between said plunger and the inlet to said discharge passage.

3. In a lubricator, a container for lubricant provided with a discharge passage and having an annular groove encircling the inlet end of said passage, a valve member controlling said passage, a plunger slidably mounted in said container, means for moving said plunger to eject lubricant from said container by way of said passage, and a filling opening communicating with said annular groove.

4. In a lubricator, the combination of a container for lubricant provided with a discharge passage, a plunger carrying a valve member for controlling said passage, said container having a filling inlet for lubricant between the inlet of said discharge passage and said plunger, and means to gradually reduce the discharge area of said passage as said plunger moves under the pressure of the lubricant entering by way of said filling inlet.

5. In a lubricator, the combination of a container for lubricant provided with a discharge passage, a spring pressed plunger for ejecting lubricant by way of said passage, means including a valve connected to said plunger for proportioning the discharge opening in accordance with the position of said plunger in said container, and means independent of said passage for filling said container.

Signed at Philadelphia, county of Philadelphia, State of Pennsylvania, this 21st day of December, 1925.

JOHN FRANKLIN MacINDOE.